(12) United States Patent
Kim

(10) Patent No.: US 11,465,498 B1
(45) Date of Patent: Oct. 11, 2022

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/408,080

(22) Filed: Aug. 20, 2021

(30) Foreign Application Priority Data

Apr. 14, 2021 (KR) .......................... 10-2021-0048743

(51) Int. Cl.
*G05G 1/30* (2008.04)
*B60K 26/02* (2006.01)
*B60T 7/06* (2006.01)

(52) U.S. Cl.
CPC .............. *B60K 26/02* (2013.01); *B60T 7/06* (2013.01); *B60K 2026/026* (2013.01)

(58) Field of Classification Search
CPC .. G05G 1/30; G05G 1/32; G05G 1/36; G05G 1/40; G05G 1/405; G05G 1/44; B60T 7/04; B60T 7/06; B60T 7/065; B60K 26/02; B60K 2026/024; B60R 21/09
See application file for complete search history.

(56) References Cited

U.S. PATENT DOCUMENTS

| | | | | |
|---|---|---|---|---|
| 6,182,525 B1 * | 2/2001 | Bowers | .................. | B60K 23/02 180/274 |
| 6,241,301 B1 * | 6/2001 | Speth | ..................... | B60N 3/063 180/90.6 |
| 6,364,047 B1 * | 4/2002 | Bortolon | ................ | B60K 23/02 74/513 |
| 8,770,616 B1 * | 7/2014 | Draper | .................. | B60N 3/066 297/75 |
| 10,503,199 B1 * | 12/2019 | Cone | ....................... | G05G 1/305 |
| 10,889,226 B1 * | 1/2021 | Dean | ......................... | B60T 7/06 |
| 10,906,514 B1 * | 2/2021 | Kim | ......................... | G05G 5/03 |

(Continued)

FOREIGN PATENT DOCUMENTS

KR    10-2017-0137427       12/2017

OTHER PUBLICATIONS

Machine Translation of KR 10-2017-0137427.*

(Continued)

*Primary Examiner* — Brian J McGovern
(74) *Attorney, Agent, or Firm* — Morgan, Lewis & Bockius LLP

(57) ABSTRACT

A foldable pedal apparatus of a vehicle may include a pedal pad, in which in a manual driving mode situation where a driver directly drives the vehicle, the pedal pad projects into an internal space of the vehicle and is popped up to be exposed toward the driver, whereas in an autonomous driving mode situation where the driver does not directly drive the vehicle, the pedal pad is inserted into a protection cover and is in a hide state where the exposure of the pedal pad toward the driver side is blocked, so that in the hide state of the pedal pad, a prominent internal design of the vehicle may be secured, and when the pedal pad is changed from the hide state to a popup state, the pedal pad is popped up through a small-sized panel hole formed on a footrest panel, and thus a high-tech image may be maximized.

19 Claims, 16 Drawing Sheets

(56) References Cited

U.S. PATENT DOCUMENTS

| | | | |
|---|---|---|---|
| 10,946,741 B1* | 3/2021 | Kim | B60T 7/06 |
| 10,994,611 B1* | 5/2021 | Kim | G05G 5/28 |
| 11,021,058 B1* | 6/2021 | Kim | G05G 5/28 |
| 11,225,226 B1* | 1/2022 | Kim | B60R 17/18 |
| 11,249,506 B1* | 2/2022 | Kim | B60R 21/09 |
| 11,305,647 B2* | 4/2022 | Kim | G05G 1/42 |
| 2003/0094070 A1* | 5/2003 | O'Neill | G05G 1/36 |
| | | | 74/560 |
| 2007/0137397 A1* | 6/2007 | Choi | G05G 1/36 |
| | | | 74/512 |
| 2009/0223319 A1* | 9/2009 | Choi | G05G 1/36 |
| | | | 74/512 |
| 2011/0132134 A1* | 6/2011 | Kim | F02D 11/02 |
| | | | 74/514 |
| 2014/0316648 A1* | 10/2014 | Min | B60W 50/08 |
| | | | 701/36 |
| 2015/0053038 A1* | 2/2015 | Kim | F16H 59/105 |
| | | | 74/473.3 |
| 2015/0107402 A1* | 4/2015 | Leem | G05G 5/03 |
| | | | 74/512 |
| 2015/0322835 A1* | 11/2015 | Ham | F01N 3/0814 |
| | | | 701/29.2 |
| 2017/0225570 A1* | 8/2017 | El Aile | B60R 7/06 |
| 2019/0310678 A1* | 10/2019 | Wojciechowski | G05G 1/36 |
| 2020/0317152 A1* | 10/2020 | Ghaffari | B60T 7/042 |
| 2021/0004040 A1* | 1/2021 | Dohmen | G05G 1/42 |
| 2021/0109560 A1* | 4/2021 | Ford | G05G 1/44 |
| 2021/0170988 A1* | 6/2021 | Villalva Sanchez | B60R 21/09 |
| 2021/0318710 A1* | 10/2021 | Miletto | B60T 7/06 |
| 2021/0331584 A1* | 10/2021 | Kim | B60T 7/06 |
| 2022/0048384 A1* | 2/2022 | Kim | B60K 26/02 |
| 2022/0055477 A1* | 2/2022 | Kim | G05G 1/44 |

OTHER PUBLICATIONS

"Motor Controller," Wikipedia Page, dated by Wayback Machine to Nov. 29, 2020, url:<https://web.archive.org/web/20201129044712/https://en.wikipedia.org/wiki/Motor_controller>.*

"Printed Circuit Board," Wikipedia Page, dated by Wayback Machine to Jul. 29, 2020, url:<https://web.archive.org/web/20200729023052/https://en.wikipedia.org/wiki/Printed_circuit_board>.*

\* cited by examiner

FOLDABLE PEDAL APPARATUS FOR VEHICLE

CROSS REFERENCE TO RELATED APPLICATION

The present application claims priority to Korean Patent Application No. 10-2021-0048743 filed on Apr. 14, 2021, the entire contents of which is incorporated herein for all purposes by this reference.

BACKGROUND OF THE INVENTION

Field of the Invention

The present invention relates to a foldable pedal apparatus for a vehicle, and more particularly to a foldable pedal apparatus for a vehicle, in which in case of a manual driving mode where a driver directly drives the vehicle, a pedal pad is exposed to project toward the driver to make a driver's operation possible, whereas in case of an autonomous driving situation, the pedal pad is hidden and the exposure of the pedal pad toward the driver is blocked to make the driver's operation impossible.

Description of Related Art

An autonomous vehicle is a smart vehicle grafted with autonomous driving technology to go to the destination by itself even though a driver does not directly operate a handle, an acceleration pedal, and a brake, and the development thereof has recently been progressed rapidly.

In case that an autonomous driving situation becomes universal, the driver may select a manual driving mode in which the driver directly drives a vehicle or an autonomous driving mode in which the driver does not directly drive the vehicle, but the vehicle drives by itself to the destination.

In the autonomous driving mode, it is necessary for the driver to stretch out his or her feet and to get some rest comfortably, and if pedals (accelerator pedal and brake pedal) located in a lower space of a driver's seat still exist therein in an exposed state in the autonomous driving mode, there are disadvantages that they interfere with the driver's rest.

Furthermore, the autonomous driving situation is the situation in which the driver does not operate the vehicle pedals (accelerator pedal and brake pedal), and if the driver operates the pedals during the autonomous driving, a vehicle controller may determine the current situation as the situation in which the driver desires to end the autonomous driving and to directly drive the vehicle, and thus may end the control for the autonomous driving.

However, since the vehicle pedals are configured to be exposed to the lower space of the driver's seat, it is feared that the driver unconsciously operates the pedals in the autonomous driving situation (pedal misoperation situation), and in the instant case, there is a risk of an accident depending on a road situation or a distance between vehicles.

Accordingly, there is a demand for technology development of a pedal apparatus, in which in case of a manual driving mode where a driver directly drives the vehicle, a pedal pad is exposed to project toward the driver to make a driver's operation possible, whereas in case of an autonomous driving situation, the exposure of the pedal pad is blocked to make the driver's operation impossible for driver's comfortable rest and safety, such as prevention of a misoperation.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a foldable pedal apparatus of a vehicle, in which in case of a manual driving mode where a driver directly drives the vehicle, a pedal pad is exposed (popup) to project toward the driver to make a driver's operation possible, whereas in case of an autonomous driving situation, the pedal pad is hidden and the exposure of the pedal pad toward the driver is blocked (hide) to make the driver's operation impossible, so that the driver can get a comfortable rest in the autonomous driving situation, and safety improvement can be further sought through blocking of a pedal misoperation in the autonomous driving situation.

Furthermore, various aspects of the present invention are directed to providing a foldable pedal apparatus, which is configured to form holes of a footrest panel, being penetrated by a pedal pad, as small as possible during popup and hide operations of the pedal pad, so that an internal design of a vehicle may be maximized and an high-tech image may be maximized in accordance with the popup of the pedal pad through the small-sized holes formed on the footrest panel in a manual driving mode.

A foldable pedal apparatus of a vehicle according to various exemplary embodiments of the present invention to achieve the above objects includes: a rotation motor fixed on a footrest panel located in a lower space of a driver's seat in the vehicle; a rotation guide coupled with the rotation motor to be rotated by a power of the rotation motor, and moving through a panel hole formed on the footrest panel when being rotated, to be hidden into a space on an engine compartment side or to project into an interior of the vehicle; and a pedal pad connected to the rotation guide and configured to rotate in accordance with operation of the driver of the vehicle, and being rotated with the rotation guide by the power of the rotation motor to be in a hide state where an exposure of the pedal pad toward the driver is blocked in being hidden into the space on the engine compartment side or to be in a popup state where the exposure of the pedal pad toward the driver is made in projecting into the interior of the vehicle through the panel hole.

The foldable pedal apparatus including the rotation motor, the rotation guide, and the pedal pad includes two apparatuses having the same configuration and provided in bilateral symmetry on the footrest panel; and one of the two apparatuses is an accelerator pedal apparatus, and another of the two apparatuses is a brake pedal apparatus.

The pedal pad in the accelerator pedal apparatus and the pedal pad in the brake pedal apparatus are symmetrically rotated based on shaft centers of each rotation motor of the two apparatuses, respectively.

The foldable pedal apparatus further includes a door rotatably provided on the footrest panel by a door shaft coupled to a portion of the door and a portion of the footrest panel to open or close the panel hole; and a door spring having both end portions supportively combined with the footrest panel and the door and providing elastic force to the door to elastically bias the door in a direction in which the door closes the panel hole.

The foldable pedal apparatus further includes a first PCB fixed on the footrest panel and controlling an operation of the rotation motor electrically connected to the first PCB.

The rotation guide includes a motor combination portion fixedly connected to a motor shaft of the rotation motor and projecting in a radial direction of the motor shaft; a pad combination portion formed in an arc along a turning radius centered by the motor shaft, and connected with a lower end portion of the pedal pad; and a support portion extending from an end portion of the pad combination portion in a longitudinal direction of the pedal pad and connected to the motor combination portion.

The pedal pad and the support portion connected to the motor shaft and the pad combination portion keep parallel to each other and project in the same direction thereof.

A popup stopper protrusion is formed to project from a side of the motor combination portion, the popup stopper protrusion comes in contact with the footrest panel when being rotated in a direction in which the rotation guide projects into the interior of the vehicle through the panel hole, and a popped initial location of the pedal pad is fixed as rotation of the rotation guide is restricted by the contact between the popup stopper protrusion and the footrest panel.

The foldable pedal apparatus further includes a protection cover connected to the footrest panel, projecting into the space on the engine compartment side, and protecting the rotation motor, the rotation guide, the pedal pad, and the first PCB by enclosing the rotation motor, the rotation guide, the pedal pad, and the first PCB therein.

The protection cover is formed in an arc having the same curvature as a curvature of the pad combination portion and having a radius larger than a radius of the pad combination portion so that interference with the rotation guide does not occur when the rotation guide is rotated.

When the rotation guide projects into the interior of the vehicle through the panel hole, the support portion of the rotation guide plugs the panel hole of the footrest panel to prevent foreign substances from flowing into the protection cover through the panel hole.

A hide stopper protrusion is formed to project into an internal space of the protection cover, the hide stopper protrusion comes in contact with an end portion of the pad combination portion when the rotation guide is rotated in a direction in which the rotation guide is inserted into the protection cover, and a hidden initial location of the pedal pad is fixed as the rotation of the rotation guide is restricted by the contact between the hide stopper protrusion and the pad combination portion.

The pedal pad is an organ type pad having a lower end portion integrally combined with a hinge pin which is rotatably combined with the rotation guide and an upper end portion which is rotated back and forth with the hinge pin against the rotation guide.

The foldable pedal apparatus further includes a first pad return spring and a second pad return spring penetrated by the hinge pin and provided so that both end portions thereof are supported on the rotation guide and the pedal pad.

The foldable pedal apparatus may further include a permanent magnet mounted on an end portion of the hinge pin; and a second PCB fixed on the rotation guide to face the permanent magnet, wherein the second PCB is configured to detect a rotation angle of the pedal pad through a magnetic flux change of the permanent magnet when the hinge pin is rotated in accordance with the rotation of the pedal pad and generates a signal related to a pedal function of the pedal pad.

When a location of the permanent magnet is changed as the pedal pad is rotated to be in the hide state or in the popup state in a response to the rotation of the rotation guide in accordance with the operation of the rotation motor, the second PCB is configured to not generate the signal related to the pedal function to prevent a malfunction of the foldable pedal apparatus.

Only when a location of the permanent magnet is changed as the pedal pad and the hinge pin are rotated in a response to the driver's operation when the pedal pad is in the popup state where the pedal pad is exposed toward the driver as the rotation guide projects into the interior of the vehicle and the rotation motor does not operate, the second PCB is configured to generate the signal related to the pedal function.

The foldable pedal apparatus according to various exemplary embodiments of the present invention is configured so that in case of the manual driving mode situation where the driver directly drives the vehicle, the rotation guide and the pedal pad project into the internal space of the vehicle and are popped up to be exposed toward the driver to make the driver's operation of the pedal pad possible, whereas in case of the autonomous driving mode situation where the driver does not directly drive the vehicle, the rotation guide and the pedal pad are inserted into the protection cover located in the engine compartment space and are in the hide state where the exposure of the pedal pad toward the driver side is blocked to make the driver's operation of the pedal pad impossible, so that the driver can get the comfortable rest in the autonomous driving situation, and the safety improvement may be further sought through the blocking of the pedal misoperation in the autonomous driving situation.

Furthermore, the foldable pedal apparatus according to various exemplary embodiments of the present invention is configured so that in the hide state, the pedal pad is inserted into the protection cover and is in the completely hidden state, and especially during the popup and hide operations of the pedal pad, the panel holes of the footrest panel, being penetrated by the pedal pad, may be formed as small as possible, and through this, the internal design of the vehicle may be maximized.

Furthermore, the foldable pedal apparatus according to various exemplary embodiments of the present invention is configured so that when the pedal pad is changed from the hide state to the popup state, the pedal pad is popped up through the small-sized panel holes formed on the footrest panel, and through this, the high-tech image may be maximized.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
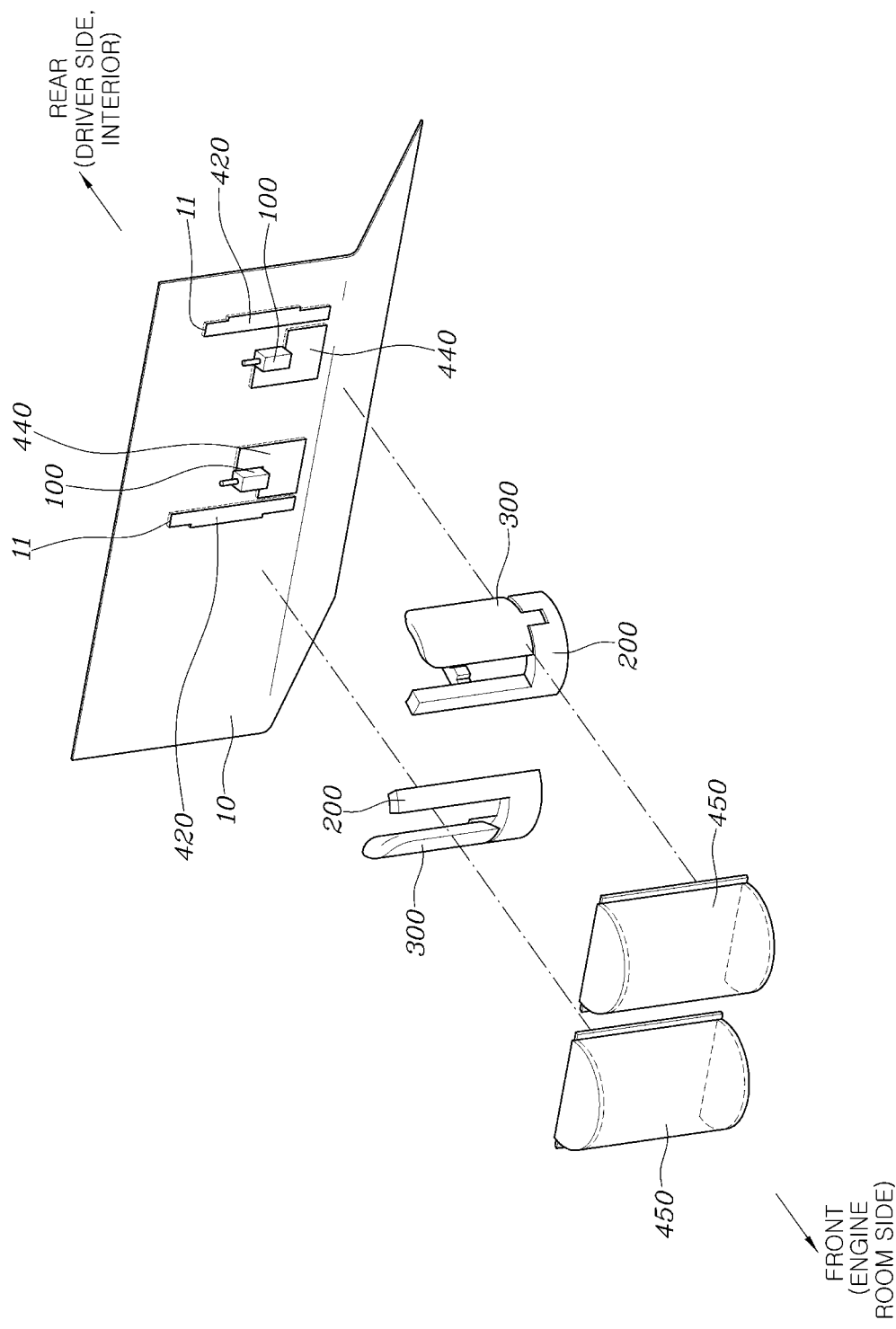
FIG. 1 is an exploded perspective view of a foldable pedal apparatus according to various exemplary embodiments of the present invention.
Figure 2:
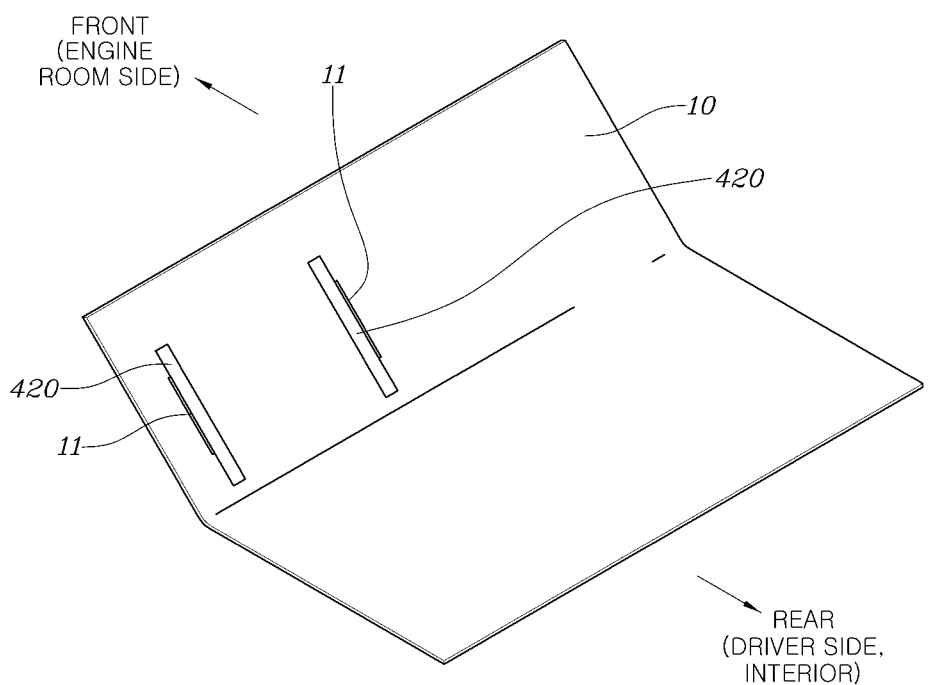
FIG. 2 is a view exemplarily illustrating a hide state in which a foldable pedal apparatus according to various exemplary embodiments of the present invention is rotated to be located in a space on an engine compartment side based on a footrest panel.
Figure 3:
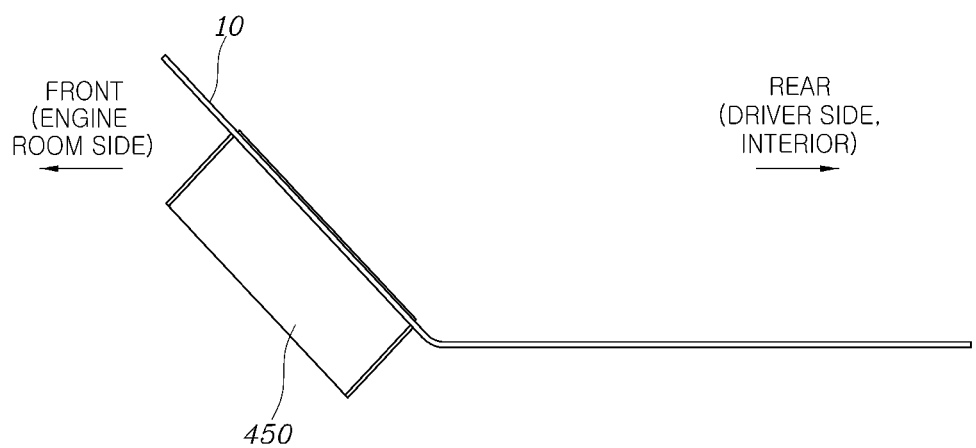
FIG. 3 and FIG. 4 are a side view and a front view of FIG. 2.
Figure 4:
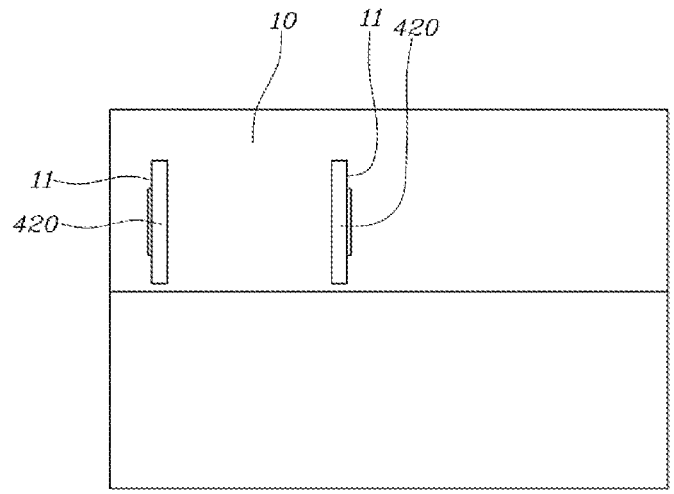
Figure 5:
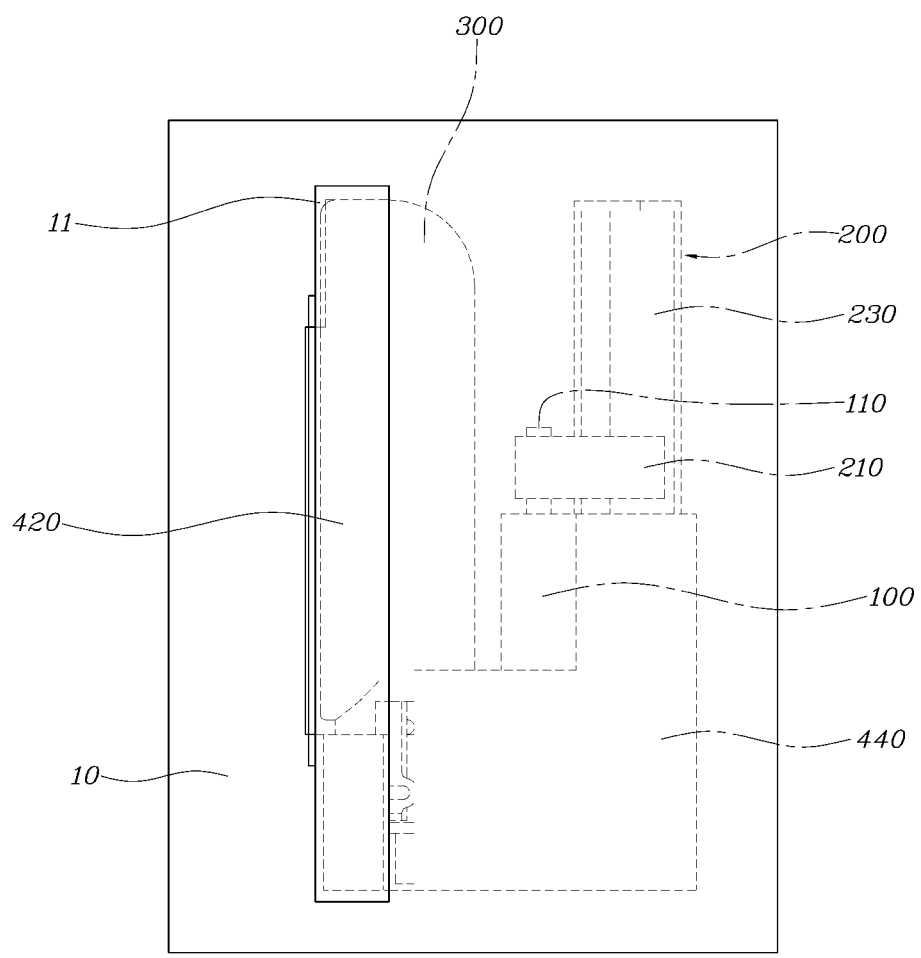
FIG. 5 is a front view of FIG. 4.
Figure 6:
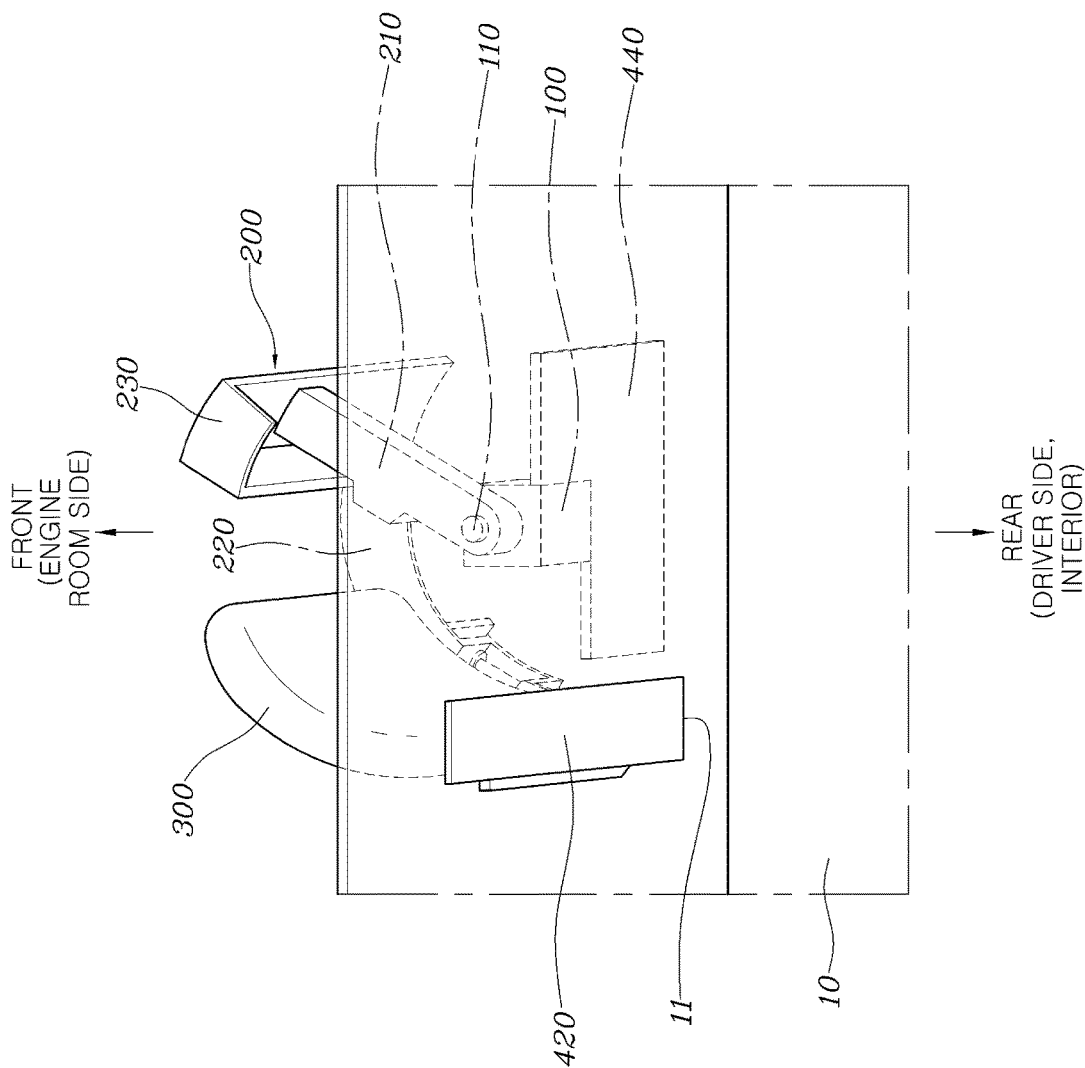
FIG. 6, FIG. 7, and FIG. 8 are a perspective view, a side view, and a front view of FIG. 5.
Figure 7:
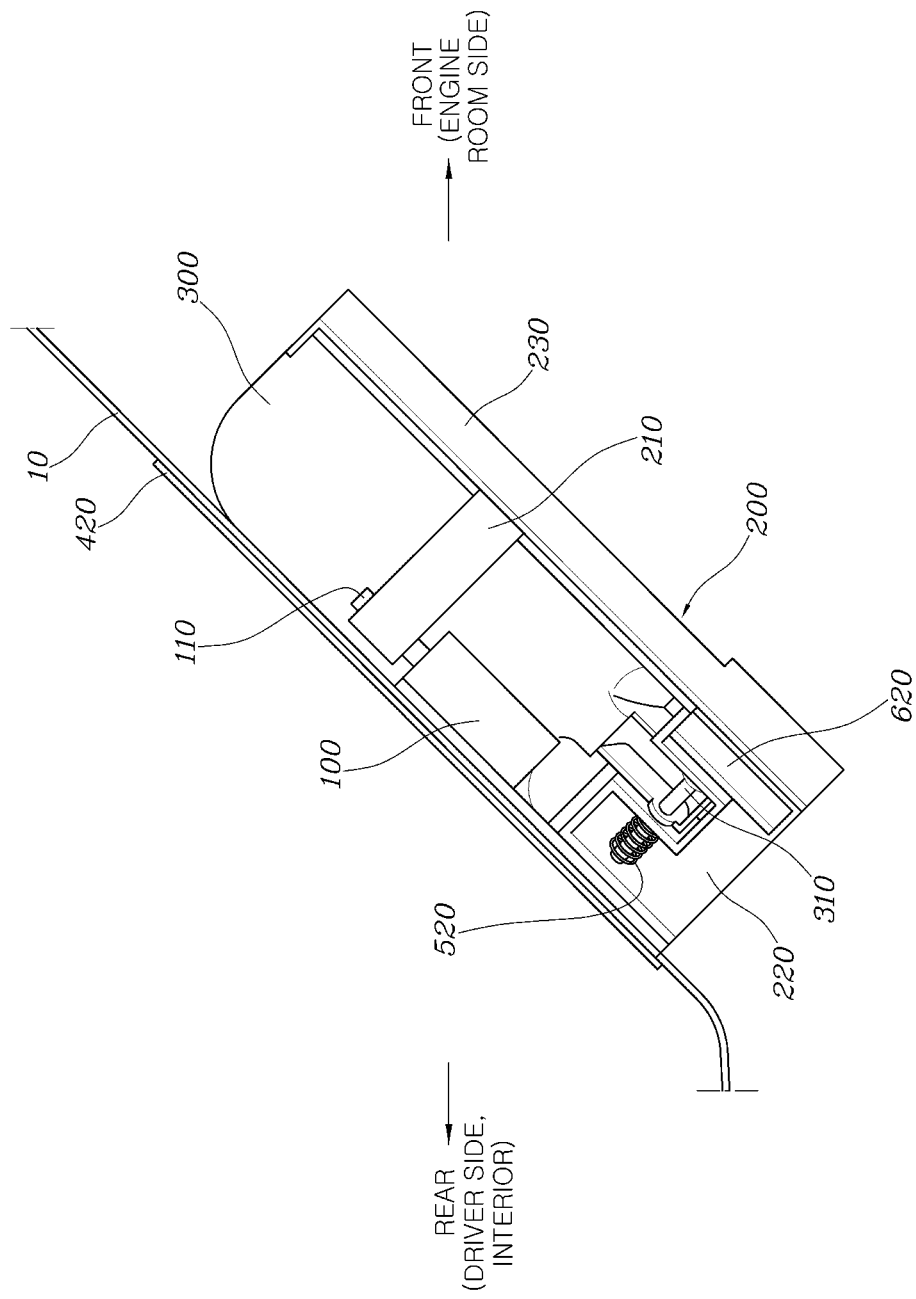

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and/or functional explanations on embodiments of the present invention disclosed in the present specification or application are merely exemplified for the purpose of explaining the exemplary embodiments of the present invention, and the exemplary embodiments according to various exemplary embodiments of the present invention may be carried out in various forms, and should not be interpreted to be limited to the exemplary embodiments described in the present specification or application.

Since embodiments according to various exemplary embodiments of the present invention may be variously modified and may have various forms, specific embodiments will be exemplified in the drawings and will be described in detail in the present specification or application. However, it should be understood that the exemplary embodiments according to the concept of the present invention are not limited to the specific disclosed forms, but include all modifications, equivalents, and/or alternatives that are included in the idea and technical scope of the present invention.

The terms, such as "first and/or second", may be used to describe diverse constituent elements, but the constituent elements should not be limited by the terms. The terms are only for the purpose of discriminating one constituent element from another constituent element, and for example, without departing from the scope according to the concept of the present invention, a first constituent element may be called a second constituent element, and the second constituent element may be called the first constituent element in a similar manner.

It should be understood that if a certain constituent element is mentioned to be "connected" or "coupled" to another constituent element, it includes both a case that the certain constituent element is directly connected or coupled to the another constituent element and a case that the certain constituent element is connected or coupled to the another constituent element via yet another constituent element. In contrast, if a certain constituent element is mentioned to be "directly connected or coupled" to another constituent element, it should be understood that the certain constituent element is connected or coupled to another constituent element without intervention of any other constituent element. Other expressions for explaining the relationship between the constituent elements, that is, "between" and "just between" or "neighboring" and "directly neighboring" should be interpreted in the same manner.

The terms used in the exemplary embodiment are used to describe specific embodiments only, but are not intended to limit the present invention. A singular expression includes a plural expression unless clearly defined in a different manner. In the exemplary embodiment, it should be understood that the term "include" or "have" specifies the presence of stated features, numerals, steps, operations, constituent elements, parts, or a combination thereof, but does not preclude the presence or addition of one or more other features, numerals, steps, operations, constituent elements, parts, or a combination thereof.

Unless otherwise defined, all terms (including technical and scientific terms) used herein have the same meanings as those commonly understood by those ordinary skilled in the art to which various exemplary embodiments of the present invention belongs. The terms that are used in the exemplary embodiment and are defined in a generally used dictionary should be interpreted as meanings that match with the meanings of the terms from the context of the related technology, and they are not interpreted as an ideal or excessively formal meaning unless clearly defined.

A control unit (controller) according to various exemplary embodiments of the present invention may be implemented through a nonvolatile memory configured to store an algorithm configured to control operations of various constituent elements of a vehicle or data for software instructions to reproduce the algorithm and a processor configured to perform an operation to be described hereinafter using the data stored in the corresponding memory. Here, the memory and the processor may be implemented by individual chips. Alternatively, the memory and the processor may be implemented by a single integrated chip. The processor may be in a form of one or more processors.

Hereinafter, a foldable pedal apparatus of a vehicle according to various exemplary embodiments of the present invention will be described with reference to the accompanying drawings.

Figure 19:
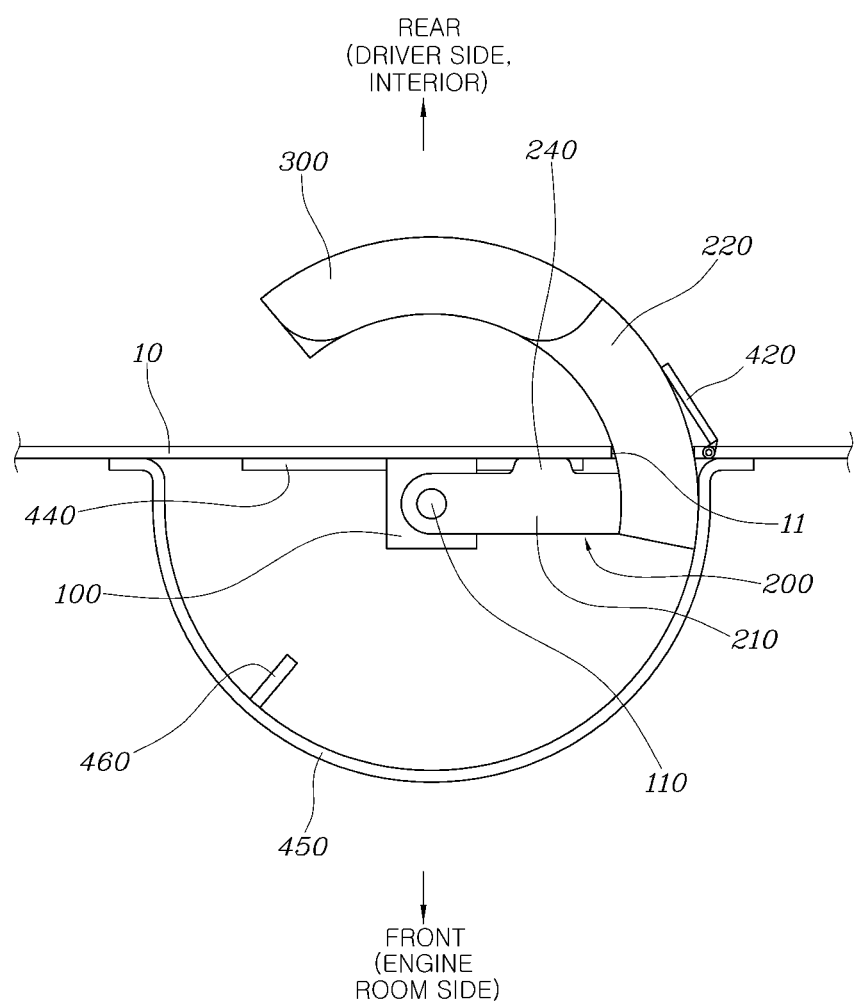
Figure 20:
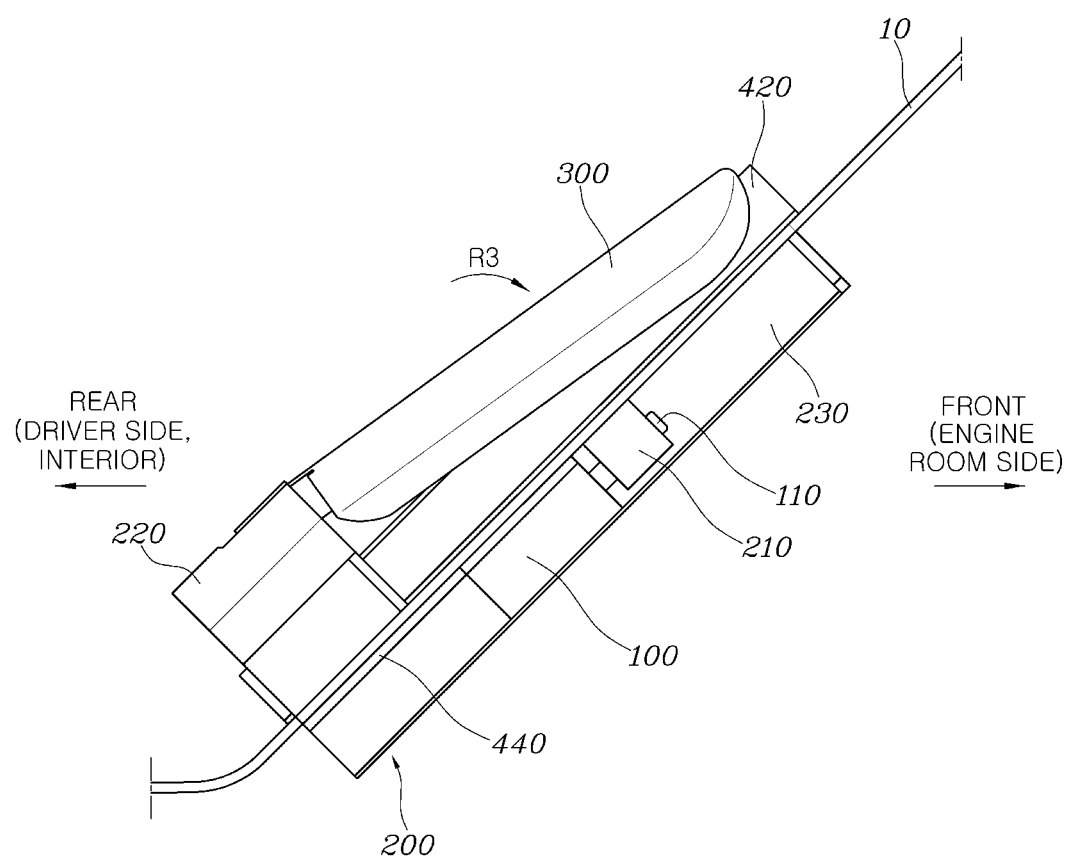
FIG. 20 is a view exemplarily illustrating a normal operation state in which a popped pedal pad is rotated forward by a driver's operation.

FIG. 1 is an exploded perspective view of a foldable pedal apparatus according to various exemplary embodiments of the present invention, FIG. 2, FIG. 3, FIG. 4, FIG. 5, FIG. 6, FIG. 7, and FIG. 8 illustrate a hide state in which a foldable pedal apparatus according to various exemplary embodiments of the present invention is rotated to be located in a space on an engine compartment side based on a footrest panel, FIG. 9, FIG. 10, FIG. 11 and FIG. 12 are views explaining a panel hole, a door, and the configuration of a foldable pedal apparatus according to various exemplary embodiments of the present invention, FIGS. 13 to 19 are views exemplarily illustrating a popup state in which a foldable pedal apparatus according to various exemplary embodiments of the present invention is rotated to project into an internal space of a vehicle based on a footrest panel, and FIG. 20 is a view exemplarily illustrating a normal operation state in which a popped pedal pad is rotated forward by a driver's operation.

As illustrated in FIGS. 1 to 20, a foldable pedal apparatus according to various exemplary embodiments of the present invention includes a rotation motor 100 fixed on a footrest panel 10 located in a lower space of a driver's seat in the vehicle; a rotation guide 200 combined with the rotation motor 100 to be rotated by a power of the rotation motor 100, and moving through a panel hole 11 formed on the footrest panel 10 when being rotated, to be hidden into a space on an engine compartment side (forward) or to move and project into an interior of the vehicle (backward); and a pedal pad 300 rotatably combined with the rotation guide 200 and being operated by a driver's foot.

In the foldable pedal apparatus according to various exemplary embodiments of the present invention, the rotation guide 200 and the pedal pad 300 are rotated together by the operation of the rotation motor 100, and in case that the rotation guide 200 and the pedal pad 300 move to be hidden into the space on the engine compartment side (forward) through the panel hole 11 formed on the footrest panel 10, the pedal pad 300 maintains a hide state in which the exposure of the pedal pad 300 toward the driver side is blocked (refer to FIG. 1, FIG. 2, FIG. 3, FIG. 4, FIG. 5, FIG. 6, FIG. 7, and FIG. 8).

Furthermore, in the foldable pedal apparatus according to various exemplary embodiments of the present invention, in case that the rotation guide 200 and the pedal pad 300 are rotated together by the operation of the rotation motor 100, and the rotation guide 200 and the pedal pad 300 move and are exposed to an internal space of the vehicle through the panel hole 11 formed on the footrest panel 10, the pedal pad 300 maintains a popup state in which the pedal pad 300 is exposed toward the driver side (refer to FIGS. 3 to 19).

the rotation motor 100 is a rotation step motor which operates to be rotated, and stops its rotation to be fixed. The rotation motor 100 is configured to be electrically connected to a power supply, and the operation of the rotation motor 100 is controlled by a first printed circuit board (PCB) to be described later.

The rotation motor 100 is fixed on a surface of the footrest panel 10 that faces forward thereof.

According to various exemplary embodiments of the present invention, the rectangular panel hole 11 elongated in a vertical direction is formed on the footrest panel 10, and through the panel hole 11, a front-side engine compartment space of the footrest panel 10 and a rear-side internal space communicate with each other.

The foldable pedal apparatus according to various exemplary embodiments of the present invention includes two apparatuses having the same overall configuration including the rotation motor 100, the rotation guide 200, and the pedal pad 300, and the two foldable pedal apparatuses having the same configuration are provided in bilateral symmetry (refer to line L1 of FIG. 15) on the footrest panel 10. One of the two apparatuses may be used as an accelerator pedal apparatus, and another of the two apparatuses may be used as a brake pedal apparatus.

On the footrest panel 10, the pedal apparatus located on the right may be used as the accelerator pedal apparatus 1, and the remaining one located on the left in symmetry with the accelerator pedal apparatus 1 may be used as the brake pedal apparatus 2.

Figure 15:
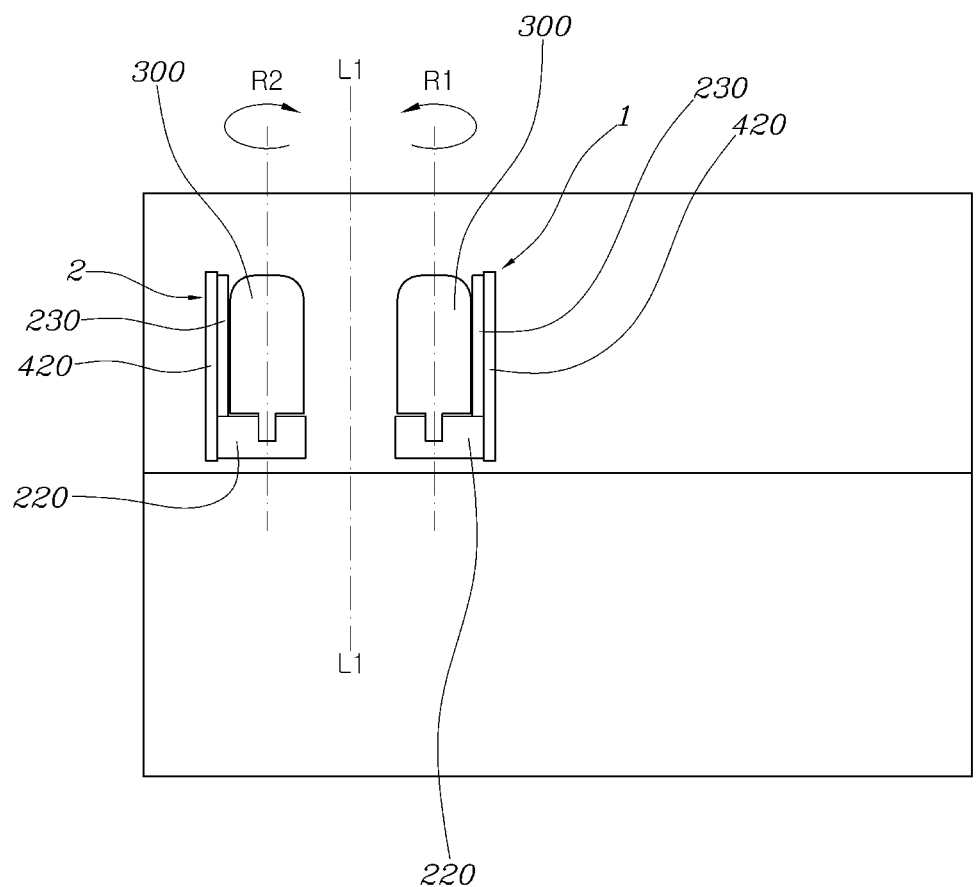
Figure 16:
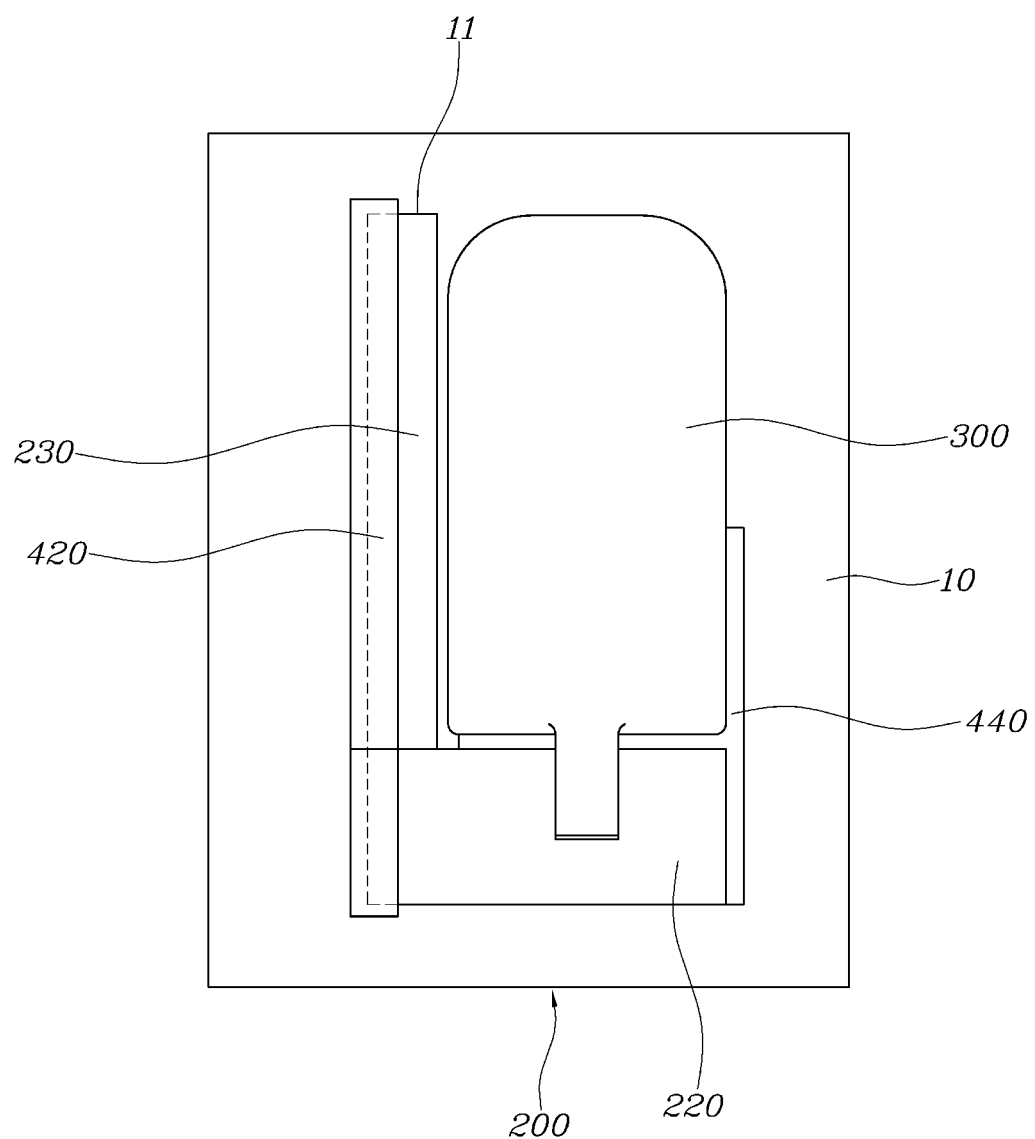
FIG. 16 is a front view of FIG. 15.
Figure 17:
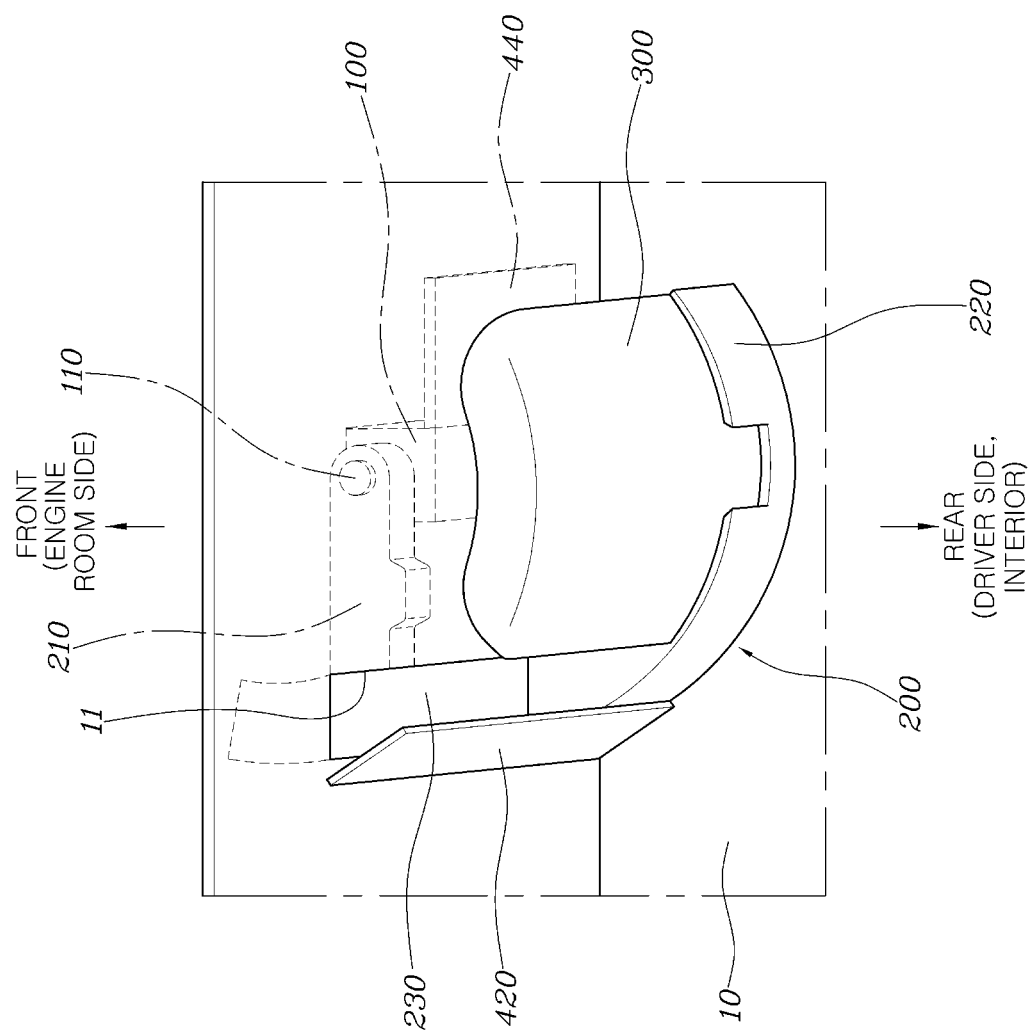
FIG. 17, FIG. 18 and FIG. 19 are a perspective view, a side view, and a front view of FIG. 16.
Figure 18:
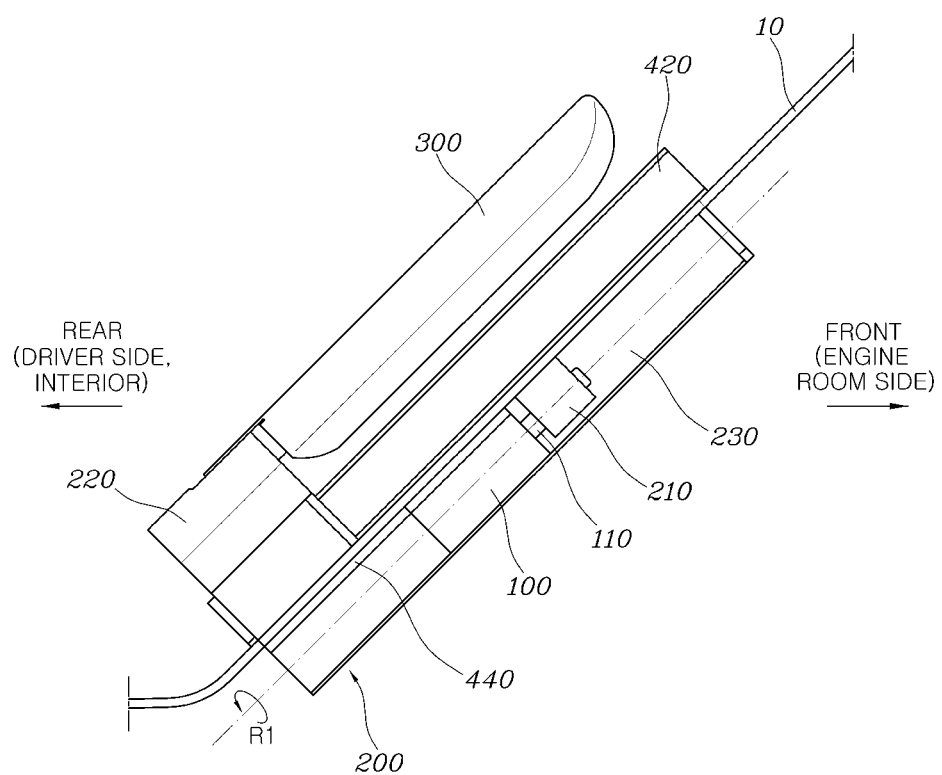

Furthermore, the pedal pad 300 being used as the accelerator pedal apparatus 1 and the pedal pad 300 being used as the brake pedal apparatus 2 are symmetrically rotated and operated based on shaft centers of connected rotation motors 100, respectively, and through this, it is possible to implement a high-tech image (refer to arrows R1 and R2 of FIG. 15).

The exemplary embodiment according to various exemplary embodiments of the present invention further includes a door 420 rotatably provided on the footrest panel 10 by the medium of a door shaft 410 to open or close the panel hole 11, and a door spring 430 having both end portions supportively combined with the footrest panel 10 and the door 420 and providing elastic force to the door 420 to rotate the door 420 in a direction in which the door 420 seals the panel hole 11.

When the pedal pad 300 is rotated in a popup direction in a hide state, the door 420 comes in contact with the rotation guide 200 and the pedal pad 300 and is rotated to open the panel hole 11, and when the pedal pad 300 in a popup state is rotated in a hide direction thereof, the door 420 seals the panel hole 11 by elasticity of the door spring 430.

If the rotation guide 200 and the pedal pad 300 move forward through the panel hole 11 and are located in the engine compartment space, that is, if the pedal pad 300 becomes in a hide state where the pedal pad 300 is located in the front based on the footrest panel 10, the panel hole 11 of the footrest panel 10 is sealed by the door 420.

In contrast, if the rotation guide 200 and the pedal pad 300 located in front of the footrest panel 10 are rotated by the power of the rotation motor 100 and project rearward based on the footrest panel 10, the rotation guide 200 and the pedal pad 300 push and rotate the door 420 to open the panel hole 11 of the footrest panel 10, and thus they are changed to the popup state where they are exposed toward the driver side through the opened panel hole 11.

The exemplary embodiment according to various exemplary embodiments of the present invention further includes a first printed circuit board (PCB) 440 fixed on the footrest panel 10 and controlling an operation of the rotation motor 100. The first PCB 440 is fixed on the surface of the footrest panel 10 that surfaces forward, and is electrically connected to the rotation motor 100.

The rotation guide 200 according to various exemplary embodiments of the present invention includes a motor combination portion 210 combined with a motor shaft 110 of the rotation motor 100 and projecting in a sideway of the motor shaft 110; a pad combination portion 220 formed in an arc along a turning radius centered by the motor shaft 110, and rotatably combined with a lower end portion of the pedal pad 300; and a support portion 230 extending from an end portion of the pad combination portion 220 in a longitudinal direction of the pedal pad 300, and connected to the motor combination portion 210.

The motor shaft 110 provided on the rotation motor 100, the pedal pad 300 combined with the pad combination portion 220, and the support portion 230 of the rotation guide 200 keep parallel to each other and project in the same direction thereof, and through this, a compact foldable pedal apparatus may be configured.

A popup stopper protrusion 240 is formed to project from one side of the motor combination portion 210, the popup stopper protrusion 240 comes in contact with the footrest panel 10 when being rotated in a direction in which the rotation guide 200 projects into the interior of the vehicle, the rotation of the rotation guide 200 is restricted by the contact between the popup stopper protrusion 240 and the footrest panel 10, and through this, a popped initial location of the pedal pad 300 is fixed (refer to FIG. 19).

The exemplary embodiment according to various exemplary embodiments of the present invention further includes a protection cover 450 combined with the footrest panel 10, projecting into the space on the engine compartment side, and protecting by covering the rotation motor 100, the rotation guide 200, the pedal pad 300, and the first PCB 440.

The protection cover 450 is fixed on the surface of the footrest panel 10 that faces the front.

The protection cover 450 is formed in an arc having the same curvature as the curvature of the pad combination portion 220 and having a larger radius than the radius of the pad combination portion 220 so that interference with the rotation guide 200 does not occur when the rotation guide 200 is rotated.

In case that the rotation guide 200 projects into the interior of the vehicle, that is, in case that the pedal pad 300 is in a popup state, the support portion 230 of the rotation guide 200 plugs the panel hole 11 of the footrest panel 10, and through this, it is possible to block an inflow of foreign substances into the protection cover 450 through the panel hole 11 in the popup state of the pedal pad 300.

Figure 8:
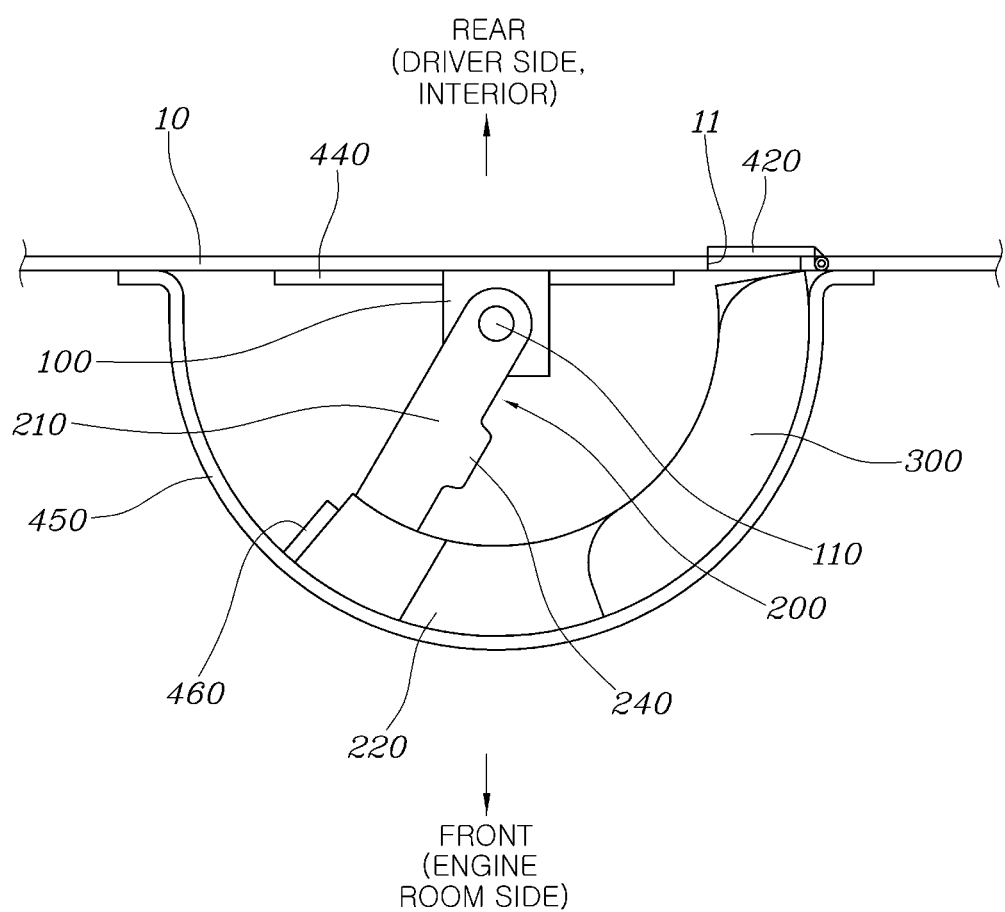
Figure 9:
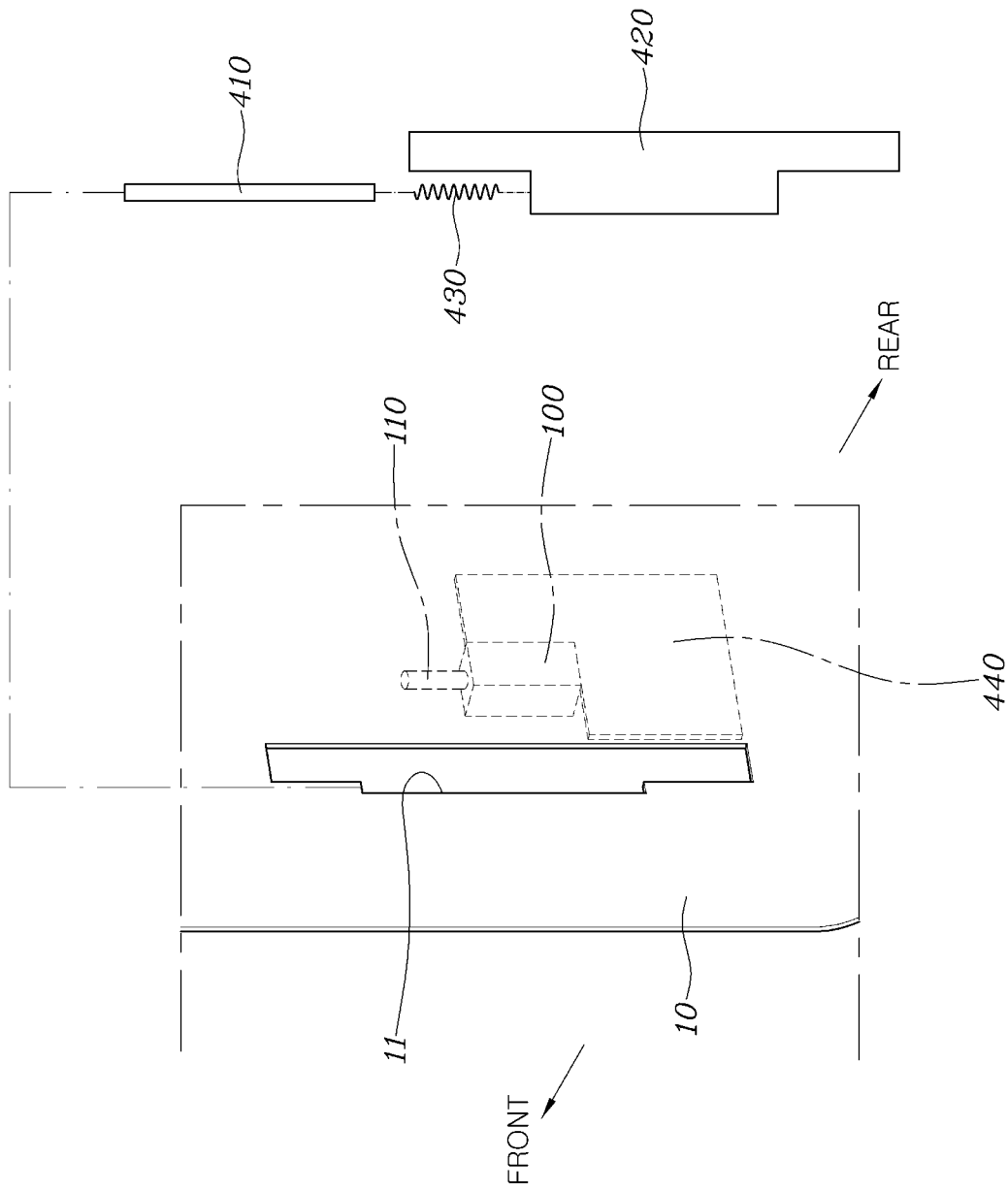
FIG. 9 is a view explaining a panel hole and a door according to various exemplary embodiments of the present invention.
Figure 10:
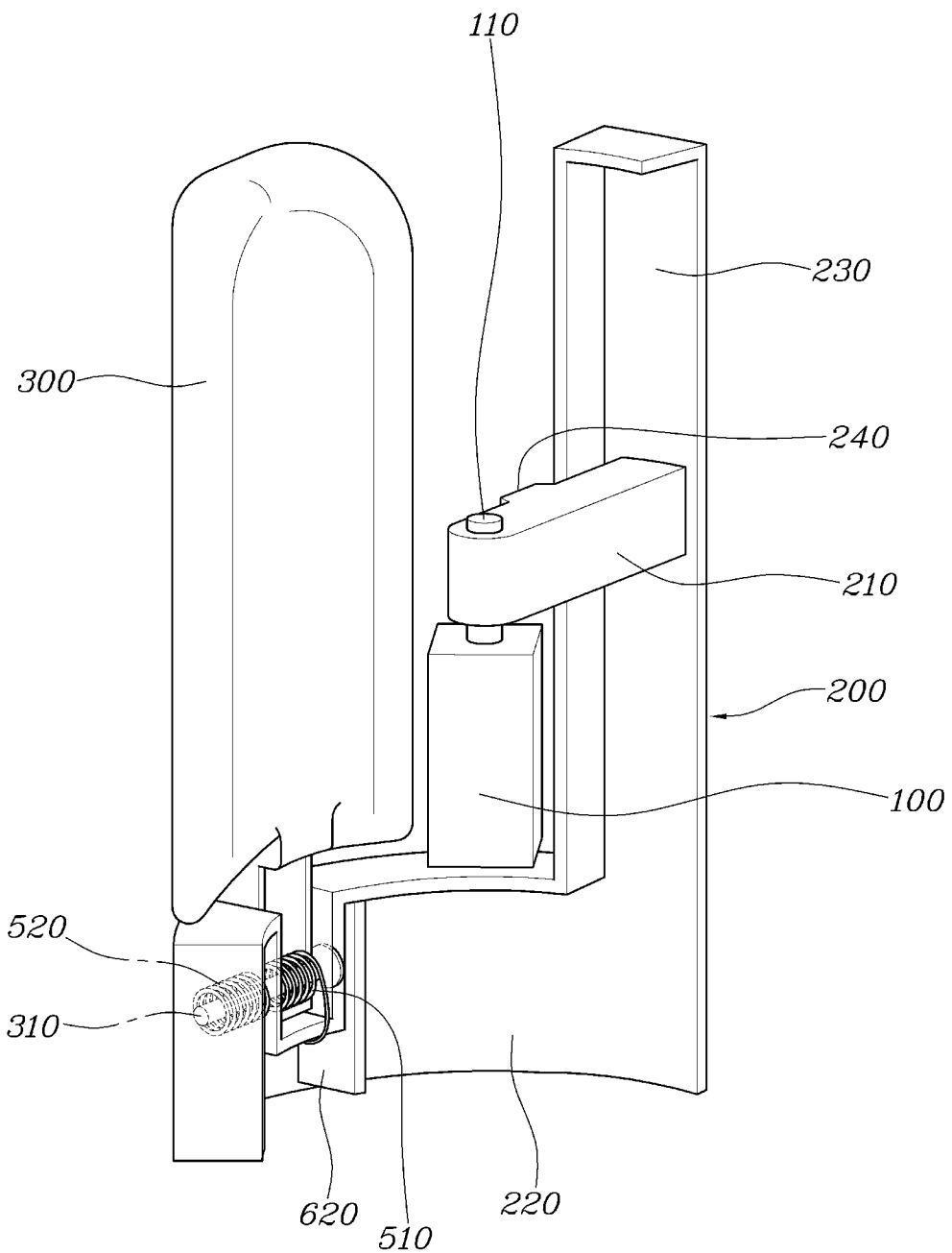
FIG. 10 is a perspective view exemplarily illustrating a combined state of a foldable pedal apparatus according to various exemplary embodiments of the present invention.
Figure 11:
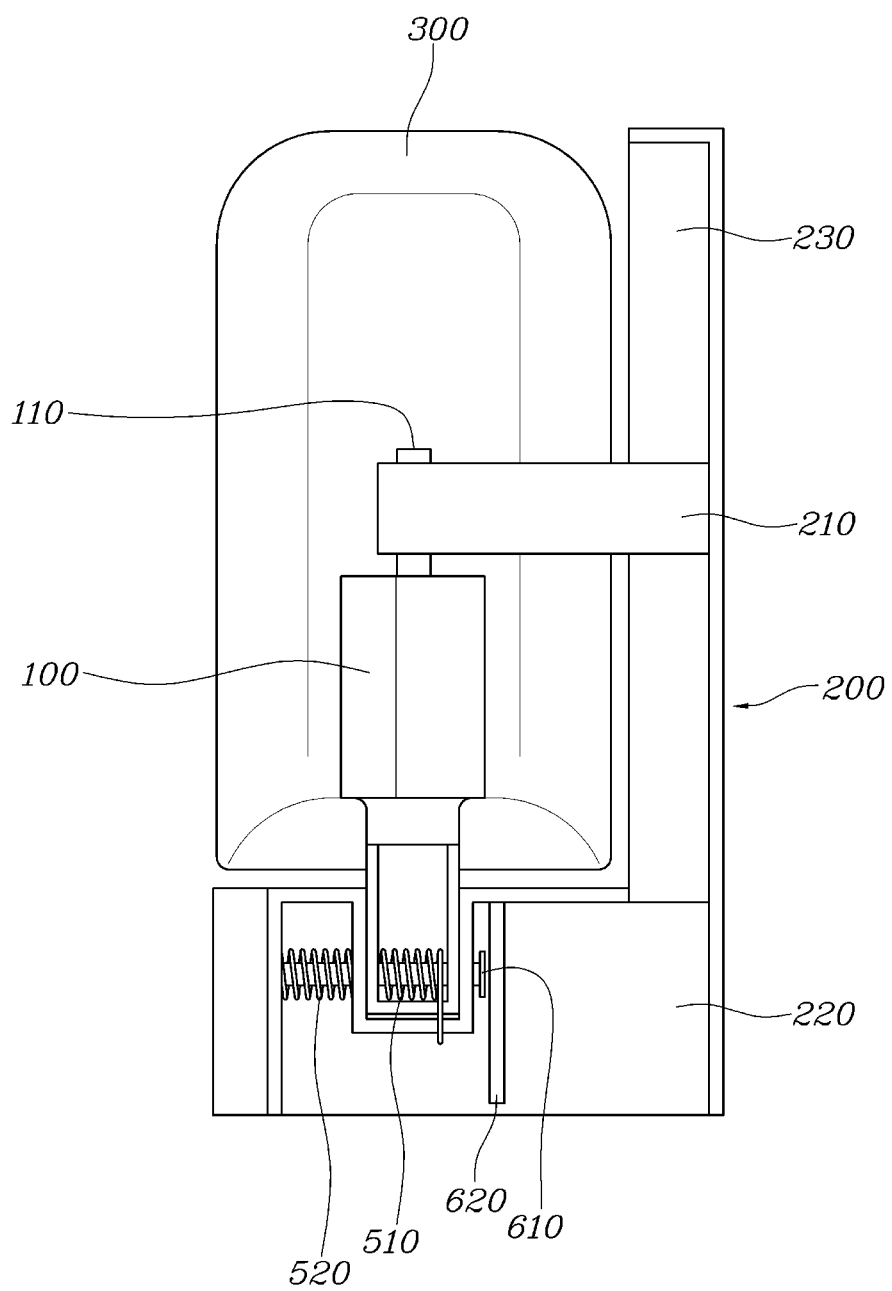
FIG. 11 is a front view of FIG. 10.
Figure 12:
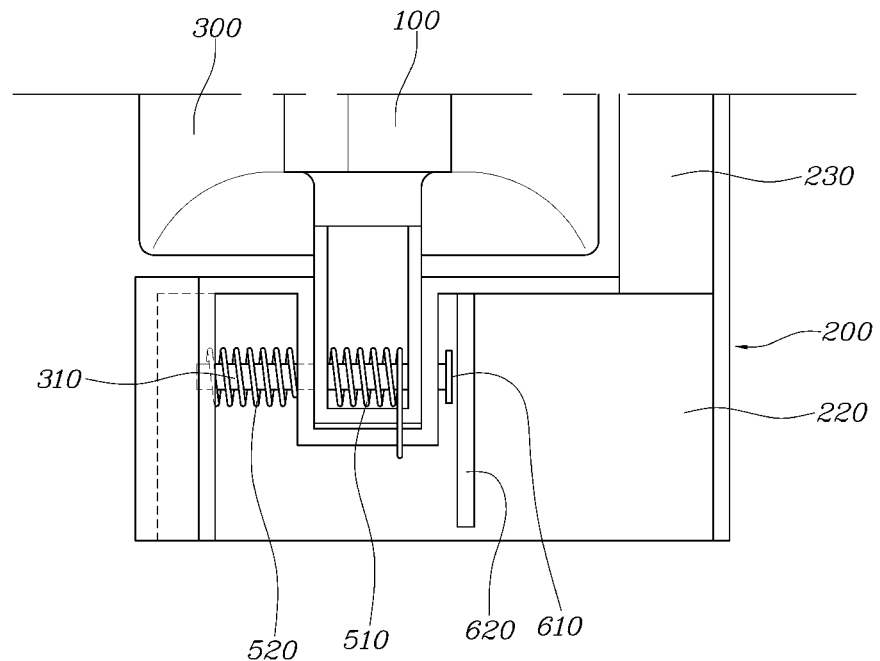
FIG. 12 is an enlarged view of a region in which a hinge pin and a second PCB are combined with each other in FIG. 11.
Figure 13:
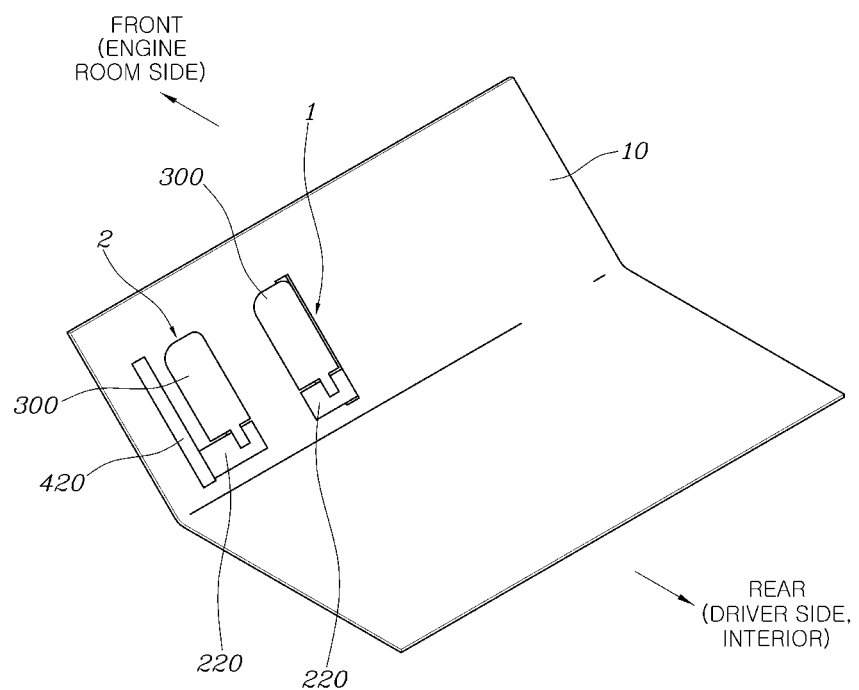
FIG. 13 is a view exemplarily illustrating a popup state in which a foldable pedal apparatus according to various exemplary embodiments of the present invention is rotated to project into an internal space of a vehicle based on a footrest panel.
Figure 14:
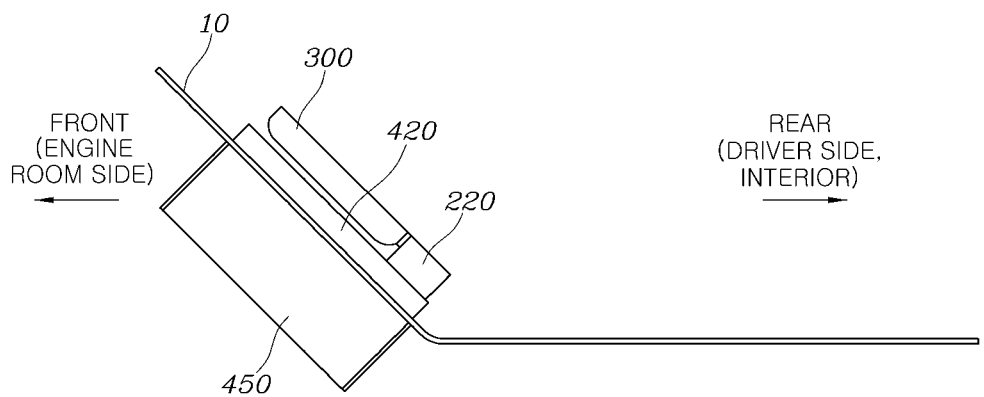
FIG. 14, and FIG. 15 are a side view and a front view of FIG. 13.

According to various exemplary embodiments of the present invention, a hide stopper protrusion 460 is formed to project into an internal space of the protection cover 450, the hide stopper protrusion 460 comes in contact with one end portion of the pad combination portion 220 when the rotation guide 200 is rotated in a direction in which the rotation guide 200 is inserted into the protection cover 450, the rotation of the rotation guide 200 is restricted by the contact between the hide stopper protrusion 460 and the pad combination portion 220, and through this, a hidden initial location of the pedal pad 300 is fixed (refer to FIG. 8).

The pedal pad 300 is an organ type pad having a lower end portion integrally combined with a hinge pin 310 which is rotatably combined with the pad combination portion 220 of the rotation guide 200 and an upper end portion which is rotated back and forth with the hinge pin 310 against the rotation guide 220.

The exemplary embodiment according to various exemplary embodiments of the present invention further includes a first pad return spring 510 and a second pad return spring 520 penetrated by the hinge pin 310 and provided so that both end portions thereof are supported on the rotation guide 220 and the pedal pad 300.

When the pedal pad 300 and the hinge pin 310 are rotated in a response to the driver's operation, the first pad return spring 510 and the second pad return spring 520 are compressed to accumulate elasticity, and when the driver's operation force is released from the pedal pad 300, the first pad return spring 510 and the second pad return spring 520 are decompressed to return to their initial states, and in the instant case, the pedal pad 300 returns to its initial location through reception of the elastic force of the first pad return spring 510 and the second pad return spring 520.

Even if any one of the first pad return spring 510 and the second pad return spring 520 is damaged, the pedal pad 300 can return to its initial location through the remaining normal return spring, and thus the first pad return spring 510 and the second pad return spring 520 perform a failsafe function.

Furthermore, foot power tuning becomes possible through tuning of spring forces of the first pad return spring 510 and the second pad return spring 520, and the first pad return spring 510 and the second pad return spring 520 are set to have different spring forces to suppress fine tremor of the pedal pad 300.

The rotation motor 500 is a rotation step motor which operates to be rotated, and stops its rotation to be fixed. The rotation motor 500 is configured to be electrically connected to a power supply, and the operation of the rotation motor 500 is controlled by a printed circuit board (PCB) to be described later.

The present invention further includes a permanent magnet 610 combined with the hinge pin 310 of the pedal pad 300, and a second PCB 620 fixed on the pad combination portion 220 of the rotation guide 200 to face the permanent magnet 610.

Furthermore, the second PCB 620 also is configured for detecting the rotation of the pedal pad 300 when the driver steps on and operates the pedal pad 300.

That is, the second PCB 620 generates a signal related to a pedal function by detecting a rotation angle of the pedal pad 300 through a magnetic flux change of the permanent magnet 610 when the hinge pin 310 is rotated in accordance with the rotation of the pedal pad 300, and the signal related to the pedal function may be a signal related to braking or a signal related to acceleration.

In an exemplary embodiment of the present invention, the second PCB 620 may include a magnetic sensor to detect the magnetic flux change of the permanent magnet 610.

FIG. 2, FIG. 3, FIG. 4, FIG. 5, FIG. 6, FIG. 7, and FIG. 8 illustrate the hide state in which the rotation guide 200 and the pedal pad 300 are located in the front based on the footrest panel 10 by the operation of the rotation motor 100, and through this, they are inserted into the protection cover 450 to block the exposure of the pedal pad toward the driver side thereof.

In the hide state, the rotation guide 2300 and the pedal pad 300 are inserted into the protection cover 450, and thus a compact structure may be implemented in case that the pedal pad 300 is hidden.

Furthermore, in the hide state of the pedal pad 300, the rotation guide 200 and the pedal pad 300 is surely hidden in the protection cover 450 having a small space, and the panel hole 11 of the footrest panel 10 is sealed by the door 420, so that the internal design of the vehicle may be maximized.

That is, the foldable pedal apparatus according to various exemplary embodiments of the present invention is configured to form the panel hole 11 of the footrest panel 10, being penetrated by the pedal pad 300, as small as possible in case of the popup and hide operations of the pedal pad 300, and through this, the internal design of the vehicle may be maximized.

As described above, if the pedal pad 300 is in the hide state, the lower space of the driver's seat becomes a wide space without the pedal interference, and thus the driver can get the comfortable rest in a relax mode, and the safety improvement may be further sought through the blocking of the pedal misoperation in the autonomous driving situation.

Furthermore, in the hide state, the pedal pad 300 is inserted into the protection cover 450 and is in the completely hidden state, and through this, the prominent internal design of the vehicle interior may be secured.

FIGS. 13 to 19 are views exemplarily illustrating the popup state in which the rotation guide 200 and the pedal pad 300 are located in the rear based on the footrest panel 10 by the operation of the rotation motor 100, and through this, the pedal pad 300 projects into the internal space of the vehicle and is exposed toward the driver side thereof.

If the rotation motor 100 operates in the hide state as described above, the rotation guide 200 and the pedal pad 300 are rotated by the power of the rotation motor 100, and move through the panel hole 11 of the footrest panel 10, and finally, the rotation guide 200 and the pedal pad 300 are changed to the popup state in which the rotation guide 200 and the pedal pad 300 project into the internal space of the vehicle based on the footrest panel 10 and are exposed toward the driver side thereof.

When the pedal pad 300 is changed from the hide state to the popup state, the pedal pad 300 is configured to be popped up through the small-sized panel hole 11 formed on the footrest panel 10, and through this, the high-tech image may be maximized.

FIG. 20 is a view exemplarily illustrating a normal operation state in which the popped pedal pad is rotated forward by the driver's operation.

As described above, if the pedal pad 300 is in the popup state, the driver performs a normal operation by stepping on the projecting pedal pad 300.

In case of the normal operation of the pedal pad 300, the foot power may be implemented through the first pad return spring 510 and the second pad return spring 520, and the movement of the pedal pad 300 may be restricted by the restrictive force of the rotation motor 100.

Furthermore, if the pedal pad 300 is rotated in a response to the driver's operation, the hinge pin 310 is rotated with the pedal pad 300, the permanent magnet 610 is rotated with the hinge pin 310, and the second PCB 620 detects the rotation angle of the pedal pad 300 through the magnetic flux change of the permanent magnet 610 which is rotated together when the pedal pad 300 is rotated, and generates a signal related to the pedal function (signal related to acceleration or signal related to braking).

The exemplary embodiment according to various exemplary embodiments of the present invention is featured so that when the location of the permanent magnet 610 is changed as the pedal pad 300 is rotated to be in the hide state or in the popup state due to the rotation of the rotation guide 200 in accordance with the operation of the rotation motor 100, the second PCB 620 does not generate the signal related to the pedal function (signal related to the acceleration or signal related to the braking) to prevent the misoperation.

That is, in case that the pedal pad 300 is changed to the hide state as the rotation guide 200 moves into the front (engine compartment space) and is inserted into the protection cover 450 by the operation of the rotation motor 100, or the rotation guide 200 and the pedal pad 300 move in the rear and project into the internal space of the vehicle by the operation of the rotation motor 100, and through this, when the pedal pad 300 is changed to the popup state in which the pedal pad 300 is exposed toward the driver side, the second PCB 620 does not generate the signal related to the pedal function even if the location of the permanent magnet 610 is changed, and thus an accident caused by the malfunction is prevented from occurring.

However, only in case that the location of the permanent magnet 610 is changed through the rotation thereof as the pedal pad 300 and the hinge pin 310 are rotated forward as illustrated by an arrow R3 by the driver's operation when the pedal pad 300 is in the popup state where the pedal pad 300 is exposed toward the driver side as the rotation guide 200 projects into the interior of the vehicle and the rotation motor 100 does not operate, the second PCB 620 generates the signal related to the pedal function, and through this, more stable operation may be sought.

As described above, the foldable pedal apparatus according to various exemplary embodiments of the present invention is configured so that in case of the manual driving mode situation where the driver directly drives the vehicle, the rotation guide 200 and the pedal pad 300 project into the internal space of the vehicle and are popped up to be exposed toward the driver side to make the driver's operation of the pedal pad 300 possible, whereas in case of the autonomous driving mode situation where the driver does not directly drive the vehicle, the rotation guide 200 and the pedal pad 300 are inserted into the protection cover 450 located in the engine compartment space and are in the hide state where the exposure of the pedal pad toward the driver side is blocked to make the driver's operation of the pedal pad 300 impossible, so that the driver can get the comfortable rest in the autonomous driving situation, and the safety improvement may be further sought through the blocking of the pedal misoperation in the autonomous driving situation.

Furthermore, the foldable pedal apparatus according to various exemplary embodiments of the present invention is configured so that in the hide state, the pedal pad 300 is inserted into the protection cover 450 and is in the completely hidden state, and especially during the popup and hide operations of the pedal pad 300, the panel holes 11 of the footrest panel 10, being penetrated by the pedal pad 300, may be formed as small as possible, and through this, the internal design of the vehicle may be maximized.

Furthermore, the foldable pedal apparatus according to various exemplary embodiments of the present invention is configured so that in case that the pedal pad 300 is changed from the hide state to the popup state, the pedal pad 300 is popped up through the small-sized panel holes 11 formed on the footrest panel 10, and through this, the high-tech image may be maximized.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A foldable pedal apparatus for a vehicle, the foldable pedal apparatus including:
a first rotation motor fixed on a footrest panel located in a lower space of a driver's seat in the vehicle;
a first rotation guide coupled with the first rotation motor to be rotated by a power of the first rotation motor, wherein the first rotation guide moves through a first panel hole formed on the footrest panel when being rotated, to be hidden into a space on an engine compartment side or to project into an interior of the vehicle; and
a first pedal pad connected to the first rotation guide and configured to rotate in accordance with operation of the driver of the vehicle,
wherein the first pedal pad is rotated with the first rotation guide by the power of the first rotation motor to be in a hide state where an exposure of the first pedal pad toward the driver is blocked in being hidden into the space on the engine compartment side or to be in a popup state where the exposure of the first pedal pad toward the driver is made in projecting into the interior of the vehicle through the first panel hole,
a second rotation motor, a second rotation guide, a second pedal pad, and a second panel hole provided with bilateral symmetry on the footrest panel relative to the first rotation motor, first rotation guide, first pedal pad, and first panel hole, respectively
wherein one of the two apparatuses is an accelerator pedal apparatus, and another of the two apparatuses is a brake pedal apparatus.

2. The foldable pedal apparatus according to claim 1, wherein the first pedal pad is an accelerator pedal pad configured to operate the accelerator and the second pedal pad is a brake pedal pad configured to operate the brake.

3. The foldable pedal apparatus according to claim 1, further comprising:
a first protection cover covering the first rotation motor, first rotation guide, and first pedal pad in the hide state, and
a second protection cover covering the second rotation motor, second rotation guide, and second pedal pad in the hide state.

4. The foldable pedal apparatus according to claim 1, further including:
a first door pivotally mounted on the footrest panel and configured to cover the first panel hole, and
a second door pivotally mounted on the footrest panel and configured to cover the second panel hole.

5. A foldable pedal apparatus for a vehicle, the foldable pedal apparatus including:
a rotation motor fixed on a footrest panel located in a lower space of a driver's seat in the vehicle;
a rotation guide coupled with the rotation motor to be rotated by a power of the rotation motor, wherein the rotation guide moves through a panel hole formed on the footrest panel when being rotated, to be hidden into a space on an engine compartment side or to project into an interior of the vehicle; and
a pedal pad connected to the rotation guide and configured to rotate in accordance with operation of the driver of the vehicle,
wherein the pedal pad is rotated with the rotation guide by the power of the rotation motor to be in a hide state where an exposure of the pedal pad toward the driver is blocked in being hidden into the space on the engine compartment side or to be in a popup state where the exposure of the pedal pad toward the driver is made in projecting into the interior of the vehicle through the panel hole;

a door pivotally mounted on the footrest panel;
wherein the door is pivotally mounted on the footrest panel by a door shaft coupled to a portion of the door and a portion of the footrest panel to open or close the panel hole, and
wherein a door spring having a first end portion and a second end portion supportively coupled to the footrest panel and the door, respectively, provides elastic force to the door to elastically bias the door in a direction in which the door closes the panel hole.

6. The foldable pedal apparatus according to claim 5, further including a first printed circuit board (PCB) fixed on the footrest panel and controlling an operation of the rotation motor electrically connected to the first PCB.

7. The foldable pedal apparatus according to claim 6, wherein the rotation guide includes:
a motor combination portion fixedly connected to a motor shaft of the rotation motor and projecting in a radial direction of the motor shaft;
a pad combination portion formed in an arc along a turning radius centered by the motor shaft, and connected with a lower end portion of the pedal pad; and
a support portion extending from an end portion of the pad combination portion in a longitudinal direction of the pedal pad and connected to the motor combination portion.

8. The foldable pedal apparatus according to claim 7, wherein the pedal pad and the support portion connected to the motor shaft and the pad combination portion keep parallel to each other and project in a same direction.

9. The foldable pedal apparatus according to claim 7, further including a popup stopper protrusion,
wherein the popup stopper protrusion is formed to project from a side of the motor combination portion,
wherein the popup stopper protrusion comes in contact with the footrest panel when being rotated in a direction in which the rotation guide projects into the interior of the vehicle through the panel hole, and
wherein a popped initial location of the pedal pad is fixed as rotation of the rotation guide is restricted by the contact between the popup stopper protrusion and the footrest panel.

10. The foldable pedal apparatus according to claim 7, further including a protection cover connected to the footrest panel, projecting into the space on the engine compartment side, and protecting the rotation motor, the rotation guide, the pedal pad, and the first PCB by enclosing the rotation motor, the rotation guide, the pedal pad, and the first PCB therein.

11. The foldable pedal apparatus according to claim 10, wherein the protection cover is formed in an arc having a same curvature as a curvature of the pad combination portion and having a radius larger than a radius of the pad combination portion so that interference with the rotation guide does not occur when the rotation guide is rotated.

12. The foldable pedal apparatus according to claim 10, wherein when the rotation guide projects into the interior of the vehicle through the panel hole, the support portion of the rotation guide plugs the panel hole of the footrest panel to prevent foreign substances from flowing into the protection cover through the panel hole.

13. The foldable pedal apparatus according to claim 10, wherein a hide stopper protrusion is formed to project into an internal space of the protection cover,
wherein the hide stopper protrusion comes in contact with an end portion of the pad combination portion when the rotation guide is rotated in a direction in which the rotation guide is inserted into the protection cover, and
wherein a hidden initial location of the pedal pad is fixed as the rotation of the rotation guide is restricted by the contact between the hide stopper protrusion and the pad combination portion.

14. The foldable pedal apparatus according to claim 7, wherein the pedal pad is an organ pad having a lower end portion integrally combined with a hinge pin which is rotatably combined with the rotation guide and an upper end portion which is rotated back and forth with the hinge pin against the rotation guide.

15. The foldable pedal apparatus according to claim 14, further including at least one pad return spring coupled to the hinge pin, wherein a first end portion of the at least one pad return spring is supported on the rotation guide and a second end portion of the at least one pad return spring is supported on the pedal pad.

16. The foldable pedal apparatus according to claim 15, wherein the at least one pad return spring includes:
a first pad return spring and a second pad return spring penetrated by the hinge pin and provided so that first and second end portions thereof are supported on the rotation guide and the pedal pad, respectively.

17. The foldable pedal apparatus according to claim 14, further including:
a permanent magnet mounted on an end portion of the hinge pin; and
a second printed circuit board (PCB) fixed on the rotation guide to face the permanent magnet,
wherein the second PCB is configured to detect a rotation angle of the pedal pad through a magnetic flux change of the permanent magnet when the hinge pin is rotated in accordance with rotation of the pedal pad and to generate a signal related to a pedal function of the foldable pedal apparatus.

18. The foldable pedal apparatus according to claim 17, wherein when a location of the permanent magnet is changed as the pedal pad is rotated to be in the hide state or in the popup state in a response to the rotation of the rotation guide in accordance with operation of the rotation motor, the second PCB is configured to not generate the signal related to the pedal function of the foldable pedal apparatus to prevent a malfunction of the foldable pedal apparatus.

19. The foldable pedal apparatus according to claim 17, wherein only when a location of the permanent magnet is changed as the pedal pad and the hinge pin are rotated in a response to the driver's operation when the pedal pad is in the popup state where the pedal pad is exposed toward the driver as the rotation guide projects into the interior of the vehicle and the rotation motor does not operate, the second PCB is configured to generate the signal related to the pedal function of the foldable pedal apparatus.

* * * * *